Patented Aug. 28, 1934

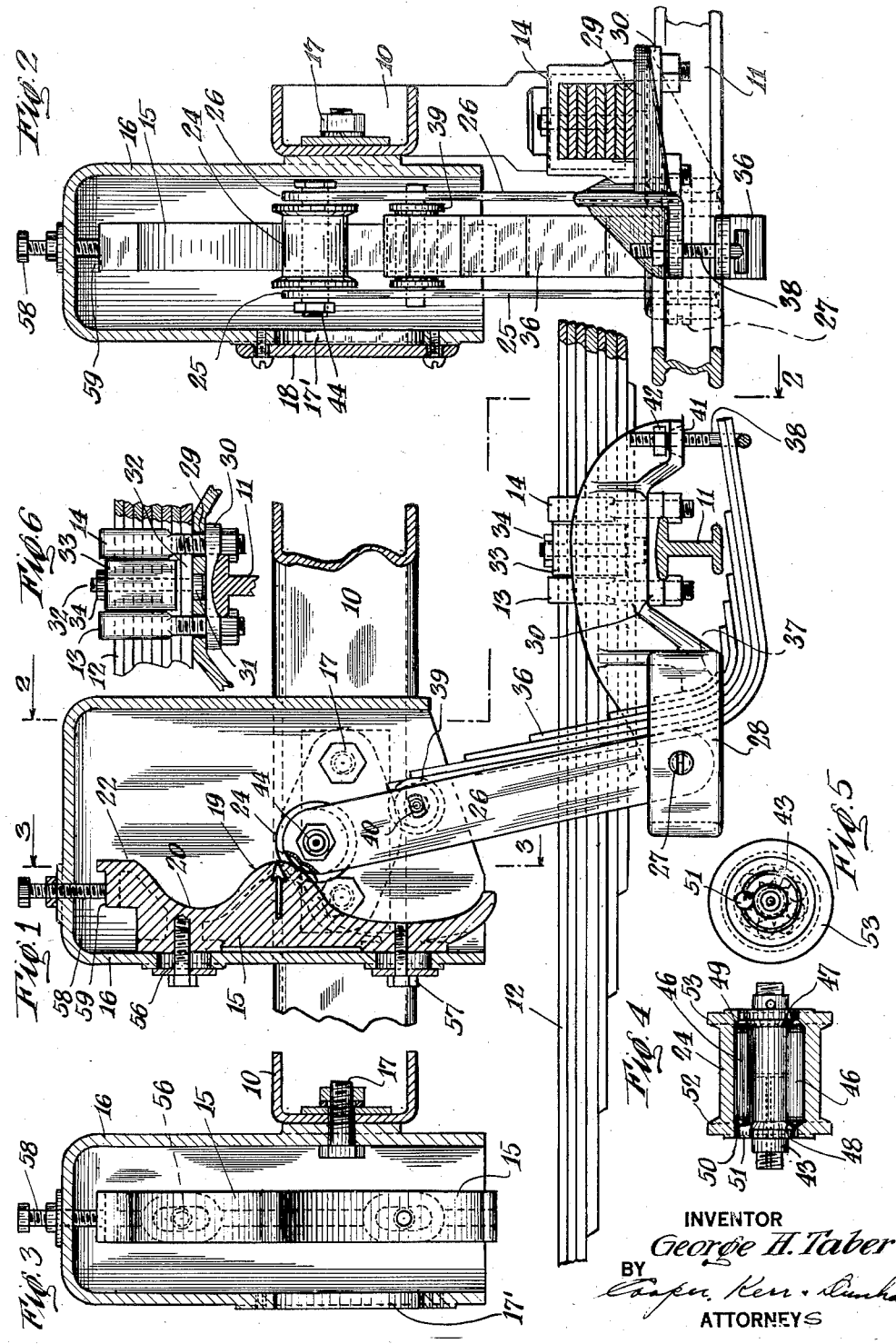

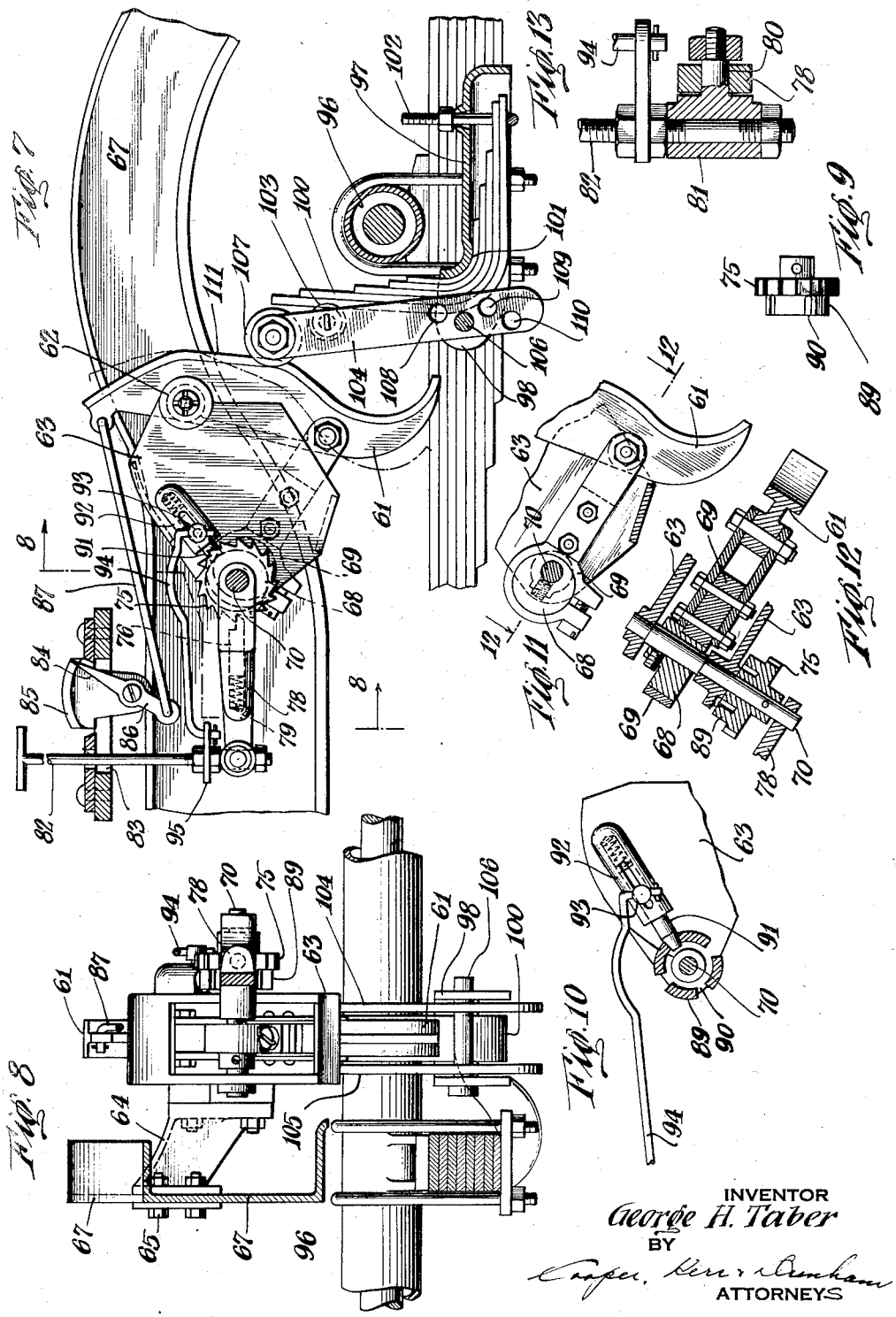

1,971,357

UNITED STATES PATENT OFFICE 1,971,357

SPRING-CONTROLLING DEVICE

George H. Taber, Binghamton, N. Y.

Application December 1, 1931, Serial No. 578,340

17 Claims. (Cl. 267—36)

This invention relates to spring-controlling devices for improving the riding qualities of vehicles having frames mounted upon springs. More particularly the invention relates to spring controlling means of the type disclosed and claimed in my co-pending application Serial No. 429,018, filed February 17, 1930, patent No. 1,897,538, February 14, 1933. In that application I have disclosed a device for controlling the spring action of a vehicle, which device comprises a spring member carrying a roller which bears upon a cam. The device is so associated in respect to the frame and axle parts as to affect the action of the vehicle spring supporting the frame from the axle.

Among the objects of the present invention is to provide a device of the character referred to capable of adaptation for producing different spring-controlling effects, and which may be readily installed and adjusted. Other objects and advantages of the novel construction and combination of parts will appear in the specification and in the claims thereof setting forth preferred embodiments of my invention which may be fully understood from the detailed description and drawings, in which:

Fig. 1 shows a partial fragmentary view of the spring-controlling means as associated with the left frame and front axle of a vehicle.

Fig. 2 is a partial fragmentary view on line 2—2 of Fig. 1.

Fig. 3 is a section on line 3—3 of Fig. 1.

Fig. 4 is a longitudinal section of the cam bearing roller.

Fig. 5 is an end view of the roller shown in Fig. 4.

Fig. 6 is a side view of a portion of the main-spring and showing the manner in which the bracket for supporting the resilient member of the spring-controlling means is mounted on the axle.

Fig. 7 is a modified form of a spring-controlled device showing means for adjusting the same for different loads. The device is shown mounted on the inside of the right frame member at the rear axle.

Fig. 8 is a view of the device shown in Fig. 7 on line 8—8 thereof.

Fig. 9 shows a view of the locking hub and ratchet wheel for controlling the set position of the cam illustrated in Fig. 7.

Fig. 10 is a section through the locking hub showing engagement of the hub and locking pin.

Fig. 11 is a detail of the eccentric strap which is connected with the cam for positioning the same.

Fig. 12 is a longitudinal sectional view on line 12—12 of Fig. 11 showing the relation of associated parts mounted on the shaft of the eccentric.

Fig. 13 is an enlarged fragmentary view through the lower end of the cam positioning handle illustrated in Fig. 7.

Having reference to Figs. 1 to 5 of the drawings, the device of the present invention there disclosed is shown associated with the forward end of the left frame member 10 of the frame or chassis of the vehicle, and 11 is the front axle. The main-spring 12 is of the usual construction and is attached to the axle by means of spring clips 13 and 14.

The device of the present invention is designed to supplement and influence the natural action of the main-spring in such a manner as to improve the riding qualities thereof. This device comprises a cam 15 which is mounted on a bracket 16 which is, in turn, permanently secured to the frame member 10 by means of bolts 17. Since it is preferable to cover the parts the bracket 16 may be made in the form of a box, as illustrated, and protection is thereby afforded against the usual grit and dirt which would otherwise be likely to come in contact with the moving parts. At one side of the bracket there is an opening 17' through which the relation of the follower and cam may be observed, and this opening is usually closed by a cover 18. The cam has an irregular surface with an elevation 19 between depressions 20 and 21. The depression 20 finishes off into an elevation 22 at the upper end of the cam member. The cam follower comprises a roller 24 carried at the upper ends of a pair of arms 25, 26 which are mounted to rock on a pin 27.

I have observed that the spacing or working distance between the axle and the frame varies about $\frac{1}{16}$ of an inch. An example of my meaning is, if some one stands on the bumper of the front end of a car and causes that end to "bound" up and down and then steps off and measures this spacing, then repeats this procedure a number of times, each measurement will indicate that this variation does not exceed $\frac{1}{16}$ of an inch. This condition is what I term a narrow "balance line" because it requires considerable force to compress the springs of the vehicle until the frame is ½ inch below its normal spacing and it requires considerable force to "lift" the frame ½ inch above its normal balance line or spacing. For this reason, I resiliently support the frame "above" normal spacing so as to provide greater resiliency and consequently eliminate the jarring effect of the main spring minus the controlling effect of the device of this invention. In order to accomplish this, I have so shaped the elevation 19 of the cam as to enable the follower to exert a supporting action and thus assist the main-spring to such an extent as to increase the spacing between the frame and axle which would otherwise exist. This action may be understood from Fig. 1 which shows the relation of the frame and axle as maintained by the assistance of a follower bearing upon the slope of a cam between elevation 19 and depression 21, the maximum elevation of the cam being indicated by the arrow, it being understood that the position of the arrow, cam and frame would be lower if the affect of the follower were removed. The follower is yieldingly pressed against the cam surface, and, under normal or "at rest" conditions, the follower contacts with the cam substantially in the relation shown in Fig. 1. In this relation when the wheel of the vehicle enters a depression in the roadbed, the reaction of the cam and follower assists the main-spring in causing the wheel to drop quickly into the depression while at the same time assisting to maintain the frame at its approximate level of travel. On the other hand when the wheel of the vehicle strikes an obstruction the spring of the follower will first be compressed slightly and then the spring-controlling device will assist the collapse of the main-spring as the result of the reaction between the follower and the slope of the cam surface intermediate elevation 19 and depression 20. If the tendency to cause collapse of the main-spring becomes extreme because of road conditions, the follower will assist the main-spring to support its load as the result of the reaction between the cam and follower as the follower travels between depression 20 and elevation 22 of the cam.

The spring-pressed follower comprises a flanged-roller 24 mounted intermediate arms 25, 26 which are pivotally supported on pin 27 carried by a bracket 28. As may be seen in Fig. 2, this bracket extends laterally from the main-spring 12 and has a portion 29 which is adapted to rest upon spring-plate 30 and intermediate the spring-plate and the lower leaf of the main-spring, Fig. 6. In order to mount the bracket in place, the axle and spring are separated and the head 31 of bolt 32 is engaged in a hole in the portion 29 of the bracket. The bolt 32 is extended upwardly through the leaves of the main-spring as the bracket is assembled in place between the lower spring leaf and the spring-plate 30. The spring clips 13 and 14 are then secured in place and in order to prevent shifting or twisting of the backet, there is provided a U-member 33 which is inverted and fitted to engage both sides and the top of the main-spring and is sufficiently wide to contact with the edges of the spring clips. This member is held in place by a nut 34 which engages bolt 32.

The follower is pressed against the cam surface by means of an auxiliary spring 36 which is fulcrumed on the bracket at 37 and has one end secured by a bolt 38. Its other end bears against a roller 39 which is mounted upon a pin 40 extending between the two arms 25—26. The pin is suitably provided with channels for enabling lubrication of the roller 39 and its end is squared as in Fig. 1, to ensure that the pin will not rotate. In order to vary the initial force of spring 36, bolt 38 is so designed as to enable variation in the point of support of the rear end of the spring. This bolt passes through a hole 41 in the bracket and a nut 42 engages a raised surface on the bracket which prevents binding. By changing the position of the nut on the bolt it is possible to raise or lower the end of the auxiliary spring and cause either an increase or decrease in its initial tension.

The forces existing between the follower and the cam are of such magnitude that it is desirable to lessen the friction in the device to the greatest extent possible, and I therefore provide an anti-friction bearing for roller 24. As illustrated in Figs. 4 and 5, the roller is mounted upon a pin 43. This pin engages holes in arms 25 and 26 and is held in place by means of nuts. Intermediate roller 24 and pin 43 there are a plurality of roller bearings 46 which are maintained in position by the shoulders 47, 48 on the pin and shoulders 49, 50 on the roller. Each pin may be inserted in position through a hole 51 at one end of the roller, Fig. 5.

As shown in Fig. 3, the cam is uniform in width and the roller is provided with flanges 52, 53 for insuring engagement of the roller and cam.

I am enabled to change the relation of the follower and the cam to position the high portion of elevation 19 to obtain the soft riding condition as explained hereinabove in reference to the position of the arrow shown in Fig. 1. The cam is mounted in the bracket box 16 by means of a number or screws 56, 57 and 58. Screw 58 bears upon a flat end 59 at the upper end of the cam member and by changing the relation of the screw to the bracket, the height of the cam member may be varied. While adjustment is taking place, screws 56 and 57 move upwardly and downwardly in the elongated slots of the bracket, and these screws are tightened after the proper height has been determined. A mark in the position of the arrow shown on the cam in Fig. 1 facilitates the adjustment. It is readily understandable from the foregoing that pressure asserted by the follower upon the cam surface below the arrow reacts in assisting the main-spring to support the frame and thus cause the frame to be normally spaced at a greater distance than would be the case if no additional upward force were provided.

The load carried by the front axle of an automobile varies very little in comparison to the load carried by the rear axle and therefore, the spring-controlling means described in reference to Figs. 1 to 5 inclusive, is well suited for the front end of an automobile. However, the load which is carried by the rear vehicle springs is usually variable and it is therefore desirable to provide some means of adjusting the auxiliary spring-controlling device in a more convenient manner. A device accomplishing this is illustrated in Figs. 7 to 13 inclusive, in which the cam surface is designed to compensate for the additional forces caused by additional loads and may be variably positioned depending upon the effect desired.

The cam member 61 is pivotally mounted at 62, and, as shown, the cam surface faces the rear end of the vehicle. Pin 62 is carried by housing 63 which forms a bracket having extension 64 Fig. (8), secured by means of bolt 65 to the frame 67 of the vehicle. The cam is maintained in a set position by means of an eccentric 68 which is mounted upon a pin 70 carried by the housing 63. Eccentric strap 69 is connected with cam member 61.

For turning the shaft 70 a ratchet wheel 75 is keyed thereto. A pawl 76, which engages with the ratchet wheel, is mounted upon an arm 78 which has one end loosely mounted upon shaft 70. A spring 79 maintains the pawl in engagement with the ratchet and the arm 78 is rocked upon shaft 70 when it is desired to rotate the shaft. The forward end of arm 78 is engaged by a stud 80 extending from a hub 81 mounted upon the lower end of rod 82 (Figs. 7 and 13). Upon raising the rod 82 the pawl will cause the ratchet wheel to be actuated one step and the ratchet wheel may be given a complete revolution by successive upward and downward movements of the rod 82. Rod 82 extends through a hole 83 in the floorboard of the vehicle and may be conveniently reached by a passenger. In order to give the passenger an idea of the setting of the cam member 61, an indicator 84 is provided. This indicator has a scale 85 graduated to indicate the position of the cam member and the scale may be calibrated in units of load so that anybody having an idea of the weight of the additional load carried by the vehicle could set the cam in a position for obtaining the riding qualities desired. The lower end of the indicator has an arm 86 which is connected directly to the cam member 61 by means of a rod 87.

In order that the cam member will not be displaced after being set, I provide a locking hub 89 which is carried by shaft 70. This hub has a plurality of circumferentially spaced holes 90 which are adapted to be engaged by locking pin 91. The locking pin is carried within the housing 92 having a slot through which extends a projection 93, and a spring within the housing constantly urges the locking pin toward the hub. Rod 94 engages projection 93 and is attached to crank 95 which may be rotated by rod 82. By connecting the locking pin with the rod 82 in the manner described, it is possible for the operator to release the cam by giving a partial rotary movement to the rod 82 and then subsequently raise the rod to rotate the eccentric and thereby change the position of the cam member. When the cam member has been positioned as desired, the locking pin 91 is permitted to enter a hole 90 of the locking hub under the action of spring 92. This action will restore the rod 82 to its normal position.

In Figs. 7 and 8 I have illustrated a second method of connecting the auxiliary spring of the follower to the rear axle housing 96. The bracket 97 which carries the auxiliary spring has a portion 98 extending laterally to the main-spring and this portion is secured to the under side of the lower leaf of the main-spring. The auxiliary spring 100 is fulcrumed at 101 and has its rear end supported by a bolt 102. Its forward end bears upon a roller 103 carried by a pin which extends between the arms 104, 105. The lower ends of these arms are joined and pivotally mounted by a pin 106 carried by the bracket, and a cam engaging roller 107 is mounted at the upper ends. Any one of the additional holes 108, 109, 110 may be used for mounting the follower upon pin 106, depending upon the height desired for roller 107 in respect to the bracket or cam.

The cam and construction shown in Fig. 7 is particularly well suited for use on a rear axle of an automobile or for supporting a load which is likely to be different for different periods of time. For example, when the roller is in the vicinity of point 111 the effect of the spring controlling device including auxiliary spring 100 will be to assist in supporting the load carried by the frame. The natural result of adding more load to the vehicle frame would be to compress the vehicle springs and bring the frame and the axle more closely together. In order to offset this tendency the cam may be rotated clockwise and to such a position, for example, as illustrated by the dotted line. In this position of the cam it is evident that the slope of the cam below its high point has been increased so that the vertical component of the reaction between the cam and cam roller is correspondingly increased. It follows therefore that the effect of the spring controlling device may be varied to suit different load conditions by rotating the cam to the position in which it will bring about the desired control of the main springs.

From what has preceded it will be noted that the side frame member 10 may be described as a longitudinally extending side frame member that is carried on and supported by a longitudinally extending side spring 12 which is in turn supported on a portion of the transversely extending axle, to-wit the transversely extending front axle of the vehicle chassis and that the side spring 12 is held in place on the axle by the bolt means provided at 13 and 14. The frame member 10 and the transversely extending axle member just referred to may be respectively considered as the supported and supporting members of a vehicle chassis and the side spring referred to may be viewed as a main spring construction which is carried by the supporting axle and which in turn is relied upon for use in supporting the main frame from the axle. Also from what has preceded it will be noted that the cam 15 is vertically positionable to any desired normal vertical position and is secured in place in its normal position through the medium of the vertically extending screws or bolts 58 and the horizontally extending holding screws or bolts 56 and 57 in a position relatively fixed in respect to the side frame member 10.

In the construction of Fig. 1 the flange rollers 24 may be referred to as the cam follower element of the cam follower construction that comprises the rollers 24 and the pair of arms 25, 26 and which arms are pivotally mounted at the lower ends thereof so as to rock on or about a pin 27 which is in turn carried by a bracket that is fixedly secured and associated with the side spring 12 and the transversely extending axle. The roller 24 or cam follower element is located at and secured to the upper ends of the arms 25, 26 which may be considered and referred to as the movable frame or body member for the cam follower element. It will be noted that the frame or body member just referred to may be considered as a member secured to the axle and the spring 12 so as to permit the movement in a general longitudinal or horizontal direction but so as to prevent movement in a general vertical direction in respect to the axle 11. There is carried by the bracket just mentioned a spring which can engage the body or frame of the cam follower element. This spring has associated therewith adjusting means which can be relied upon to impart by and through the spring a desired pressure effect in a general horizontal or longitudinal direction of the cam roller or cam follower into forcible engagement with the cam surface of the cam whereby a desired normal horizontal adjustment of the cam roller or cam follower element 24 can be realized and effected. This horizontal adjustment which is incident to the horizontal pressure exerted by the spring can be relied upon to obtain a vertical lifting of the cam and the frame 10 to which the cam is attached to a desired normal position relative to the axle. The means for effecting this horizontal adjustment of the spring comprises the member 38. The member or device which comprises the roller 24, arms 25, 26 and the spring 36 and the spring adjusting means therefor may be broadly and collectively referred to as a spring and roller power element carried by and from the transversely extending axle and which has means for positioning the roller or cam follower element horizontally according to a desired spring pressure and in reference to a vertically adjustable cam, and with which cam the cam follower element or roller has continuous cooperative engagement.

The cam 15 and the cam follower element 24 and their associated parts may be considered as cooperating and associated cam elements one of which may be defined as a cam surface providing element which is adjustably secured to the main frame member 10 in a manner to permit of vertical adjustment in respect to the main frame member 10, while the parts which comprise the roller 24 may be considered as a cam follower element which is connected to the axle member 11 and which is mounted so as to permit general horizontal movement of the cam follower element 24 in a general horizontal direction as relative vertical movement between the cam elements takes place and as is necessary for the cam follower element to follow the successively arranged high and low points that extend along the cam engaging surface. In short, in the construction shown in Fig. 1, and the same is true of the construction shown in Fig. 7, there is provided an auxiliary device which employs a cam surface providing element and a cam follower element which are normally spring pressed towards each other in one general direction but which can be adjustably positioned in respect to each other in another or other general direction so that the cam surface and the follower member are adjustably positioned in and along such other general direction thus insuring a structure which provides a compound adjustment as between the cam elements. This dual or compound type of adjustment as between the associated cam elements is believed to be broadly new with applicant and some of the claims in this application are directed broadly to an auxiliary supporting structure or device embodying or employing the dual or compound type of adjustment.

I have disclosed herein two different modifications of a spring-controlling device, such as would be used on the front and rear parts of a vehicle, such as an automobile, but I wish it to be understood that I contemplate such changes and modifications as are within the scope of the appended claims and that the use of the device is dependent upon the conditions existing in respect to the various springs of any given vehicle.

I claim:

1. An auxiliary device for use in combination with a vehicle frame, axle and main spring between said frame and axle; comprising a cam and a spring pressed follower, said cam having at least two elevations and two depressions, the follower normally bearing upon one of said elevations at a predetermined position, and means for varying the predetermined position of normal engagement of the cam and follower.

2. An auxiliary device for use in combination with a vehicle frame, axle and main spring between said frame and axle; comprising a cam and a spring pressed follower associated with said frame and axle and controlling the action of said main spring under certain conditions, said cam being adjustably mounted upon said frame for enabling initial settling thereof in relation to said follower, and means for varying the normal force of compression between said follower and cam.

3. An auxiliary device for use in combination with a vehicle frame, axle and main spring between said frame and axle; comprising a cam carried by said main frame, a spring pressed follower carried by said axle, said cam being so shaped as to influence the action of the main spring, and means for changing the position of said cam in respect to said follower so as to cause the cam and follower to exert different influences upon the main spring under the same spacing of the main frame and axle.

4. An auxiliary device for use in combination with a vehicle frame, axle and main spring between said frame and axle; comprising a cam carried by said main frame, a spring pressed follower carried by said axle, said cam being so shaped as to influence the action of the main spring, and means for changing the position of said cam in respect to said follower to exert different influences upon the main spring, said means comprising an eccentric and a strap secured to said cam.

5. An auxiliary device for use in combination with a vehicle frame, axle and main spring between said frame and axle; comprising a cam, a spring pressed follower, means adjustably mounting said cam on said main frame, manipulative means for changing the position of said cam mounting and an indicator whereby a user may ascertain the tilted position of said cam on its mounting.

6. An auxiliary device for use in combination with a vehicle frame, axle and main spring between said frame and axle; comprising a cam carried by said main frame, a bracket on said axle, and a follower carried by said bracket and comprising a device having one end movably connected to the bracket and at the other end the cam follower part that directly engages said cam and that travels along the cam as the cam and follower part move relative to each other, and a spring acting upon said device to press the follower part against the cam, said spring having adjustable means operatively associated therewith and by which the pressing effort of the follower part against the cam can be adjusted.

7. An auxiliary device for use in combination with a vehicle frame, axle and main spring between said frame and axle; comprising a cam carried by said main frame, a bracket on said axle, a follower carried by said bracket and comprising a device having one end movably connected to said bracket and at the other end the part of the follower that engages the cam, a spring acting upon said device to press said follower part against the cam, means between said bracket and a portion of said spring for effecting a positioning of a portion of said spring relative to the bracket and thereby effecting the spring pressure relative to the follower part, and means enabling adjustment of the normal relation between said cam and follower.

8. An auxiliary device for use in combination with a vehicle frame axle and main spring between said frame and axle; comprising a cam carried by said main frame, a bracket on said axle, a follower carried by said bracket and comprising a device having one end pivotally connected to said bracket and at the other end the follower part that is movable so as to constantly engage the cam, a spring acting upon said device in a manner to effect a pressing of said follower part against the cam, said cam being mounted for rotational movement and manipulative means for adjusting the seating of the cam.

9. In a vehicle chassis construction a frame member providing a supported member of the chassis, an axle member providing a supporting member of the chassis, a main spring construction carried by said axle member and in turn providing support for said frame member, and an auxiliary supporting device provided between said supporting and supported members of the chassis; which said auxiliary device comprises associated cam elements, one of which associated cam elements is a cam surface providing element that is connected to one of said chassis members, the other of which associated cam elements is a cam follower element that is connected to the other of said chassis members, at least one of said cam elements being connected to its corresponding chassis member in such a manner as will always permit engagement of the cam follower element and the cam surface of the cam surface providing element, at least one of said cam elements being provided with an associated adjustable spring means which is relied upon to maintain the cam elements in forcible engaging contact, spring adjusting means for adjusting the forcing effect of said spring means, and a positioning means for positioning one of said cam elements relative to the chassis member with which it is connected and to which it corresponds, said cam surface providing element having the surface thereof extending along a general longitudinal path and shaped so as to have high and low points arranged along said path, the parts of said auxiliary device being arranged so that by adjusting said spring means there can be obtained and realized a desired forcing effect as between the cam elements at and for a normal or at rest condition as between said cam elements and which forcing effect is exerted in a general direction that is transverse to the longitudinal path of the cam surface, the parts of said auxiliary device being arranged so that by adjustment of one of said cam elements in respect to the member carried thereby there can be obtained and realized a desired adjustment as between the cam elements in the general longitudinal direction of the cam surface whereby as the result of said relative longitudinal adjustment said elements can be brought to a particular normal longitudinal position as between them.

10. In a vehicle chassis construction a frame member providing a supporting member of the chassis, an axle member providing a supporting member of the chassis, a main spring construction carried by said axle member and in turn providing support for said frame member, and an auxiliary supporting device provided between said supporting and supported members of the chassis for regulating at will the normal or at rest position as between said chassis members and for influencing the character of the movements as between said chassis members incident to the use of the vehicle, which said auxiliary device comprises associated cam elements vertically movable relative to each other, one of which cam elements is a cam surface providing element that is connected to one of said chassis members, the other of which cam elements is a cam follower element that is connected to the other of said chassis members, at least one of said cam elements being connected to its corresponding chassis member in such a manner as will permit engagement of the cam follower element with the cam surface of the cam surface providing element during said vertical movement as between said cam elements, at least one of said cam elements being provided with an associated adjustable spring means which is relied upon to maintain said cam elements in forcible engaging contact, spring adjusting means for adjusting the forcing effect of said spring and a positioning means for vertically positioning one of said cam elements relative to the member to which it is connected, the cam surface of said cam surface providing element being arranged so that it extends in a general upright path and shaped so as to provide high and low points along said upright path, the parts of the auxiliary device being arranged so that by adjusting of said spring adjusting means the forcing effect in a general horizontal direction between the cam elements can be regulated at and for a normal or at rest position as between said cam elements, the parts of said auxiliary device being arranged so that by the adjustment of one of said cam elements in respect to its corresponding chassis member there can be effected in a general vertical or upright direction the relative vertical positioning of the cam surface and the cam follower element according to a desired normal position.

11. In a vehicle chassis construction a frame member providing a supported member of the chassis, an axle member providing a supporting member of the chassis, a main spring construction supported by said axle member and in turn providing support for said frame member and an auxiliary supporting device provided between said supporting and supported members of the chassis which said device comprises a cam element positionable in respect to said frame member, a cam follower element connected to said axle member but so as to permit relatively horizontal movement of the cam follower element in respect to the axle member, an adjustable spring means associated with said axle member and said cam following element, spring adjusting means for adjusting the effect of said spring and thereby said cam follower element so that the latter moves in forcible operative engagement with the cam element, and a positioning means carried by said frame member for positioning said cam element relative to the frame member to which the cam element is connected.

12. An auxiliary device for use in combination with a vehicle frame member, an axle member, and main spring between said frame member and said axle member; which device embodies functionally associated cam elements one of which cam elements is a cam surface providing element that has receding and protruding portions arranged along the cam surface thereof, the other of which cam elements is a cam follower element that is mounted so as to follow said cam surface due to a permitted horizontal movement of the cam follower as the cam elements move relative to each other in a general vertical direction, which said device comprises in combination said cam elements, one of which cam elements when in use is connected to one of said members, the other of which cam elements when in use is connected to the other of said members, an adjustable spring means for effecting a continuous forcing in a general horizontal direction of the cam elements towards each other, and means for effecting relative vertical positioning as between the cam elements, which last mentioned means is relied upon for effecting a desired normal positioning in a general vertical direction of the cam elements in respect to each other.

13. An auxilary device for use in combination with a vertical frame member, an axle member and main spring between said frame member and said axle member which device embodies functionally associated cam elements, one of said associated cam elements being a cam surface providing element the cam surface of which has raised and depressed portions arranged along the same, another of said associated cam elements being a cam follower element that engages and follows said cam surface as relative movement takes place between said cam elements, said auxiliary device when in use being arranged so that one of said cam elements is carried by and connected to said frame member but in a manner to permit vertical adjustment of the cam element in respect to the frame member, and so that the other of said cam elements is carried by and connected to said axle member but so as to permit movement relative to said axle member in a general horizontal direction as said cam follower element follows said cam surface incident to relative vertical movement as between the cam elements and incident to a deflection of the main spring and consequent vertical movement as between the frame member and the axle member, which said cam device comprises in combination with said cam elements an adjustable spring means for effecting a forcing of the cam follower element in a general horizontal direction according to an adjusted spring pressure for a normal position for engagement of the cam follower element with the cam surface providing element, and means for effecting positioning in a vertical direction of the cam surface of the cam surface providing element relative to the cam follower element and also relative to the frame member so as to obtain a desired normal relative vertical position as between said cam elements.

14. An auxiliary supporting and motion controlling device for use in combination with a vehicle frame, axle and main spring between said frame and axle; which said device comprises cooperatively associated cam elements and which when in use has one of said cam elements connected to said frame and the other of said cam elements connected to said axle, one of which cam elements includes a cam surface providing element the cam surface of which comprises high and low points arranged therealong, the other of which cam elements includes a cam follower element which functionally engages said cam surface of the cam surface providing element as relative movement in the general direction of the path of said cam surface takes place, said device being constructed whereby said engagement as between the cam surface providing element and said cam follower element can take place as the frame moves towards and from the axle as the vehicle is being used, said device comprising adjustable means for normally yieldably forcing said cam elements towards each other according to a desired pressure for a normal relative position as between said cam elements in a direction which in general is transverse to the general direction of the path of said cam surface, said device also having means for effecting a relative positioning of said cam elements in a direction along the general direction of the path of said cam surface.

15. An auxiliary device for use in combination with a vehicle frame, axle and main spring between said frame and axle; comprising means assisting the main spring to maintain its load in a predetermined position in respect to the axle, said means comprising a cam having at least one curved high portion and at least two lower portions, one on either side of said high portion of said cam, a follower and resilient means pressing the follower against the high portion of said cam, which cam is so disposed in relation to said follower as to normally maintain the desired predetermined position, and adjustable means supporting said cam whereby its initial seating in relation to the frame may be varied.

16. An auxiliary device for use in combination with a vehicle frame, axle and main spring between said frame and axle; comprising a cam having at least one curved high portion and at least two lower portions, one on either side of said high portion of said cam, and a spring pressed follower normally engaging the high portion of said cam, said cam being adjustably mounted upon said frame for enabling the initial seating of the cam at an elevation thereof in relation to said follower.

17. An auxiliary device for use in combination with a vehicle frame, axle and main spring between said frame and axle; comprising a cam carried by said main frame, which said cam has at least one curved high portion and at least two lower portions, one or either side of said high portion of said cam, a spring pressed follower carried by said axle, which said follower normally engages the high portion of the cam, said cam thus being so shaped as to influence the action of the main spring, means for adjustably supporting said cam, and locking means for maintaining said cam in a fixed position.

GEORGE H. TABER.